United States Patent [19]
Byrne

[11] 3,826,964
[45] July 30, 1974

[54] DIGITAL SERVO CONTROLLER

[75] Inventor: Frank Byrne, Cocoa Beach, Fla.

[73] Assignee: The United States of America as represented by the Administrator of the National Aeronautics and Space Administration, Washington, D.C.

[22] Filed: June 28, 1973

[21] Appl. No.: 374,583

[52] U.S. Cl............... 318/602, 318/603, 318/664
[51] Int. Cl............................................. G05b 19/28
[58] Field of Search ............ 318/664, 603, 602, 604

[56] References Cited
UNITED STATES PATENTS
| | | | |
|---|---|---|---|
| 3,448,360 | 6/1969 | Pohl | 318/602 X |
| 3,500,449 | 3/1970 | Lenz | 318/602 X |
| 3,569,815 | 3/1971 | McNaughton | 318/664 X |
| 3,644,892 | 2/1972 | Szymber | 318/664 X |
| 3,675,107 | 7/1972 | Barber | 318/603 X |

Primary Examiner—B. Dobeck
Attorney, Agent, or Firm—James O. Harrell; John R. Manning; John H. Warden

[57] ABSTRACT

A system for generating a signal for controlling the rotation of a shaft supporting an antenna so that the antenna is rotated the shortest angular distance from a present angular position to a new desired angular position. The system comprises a shaft encoder means which generates a digital encoder signal indicating the present position of the shaft. A command signal is compared with the encoder signal to produce an analog signal for rotating the antenna. An error signal is produced for controlling the direction of rotation of the antenna.

5 Claims, 2 Drawing Figures

DIGITAL SERVO CONTROLLER

ORIGIN OF THE INVENTION

The invention described herein was made by an employee of the United States Government, and may be manufactured and used by or for the government for governmental purposes without the payment of any royalties thereon or therefor.

BACKGROUND OF THE INVENTION

The invention relates generally to a digital servo controller, and more particularly to a controller which is capable of rotating a shaft the shortest angular distance from a present angular position to a new desired angular position. Heretofore, the synchro-demodulator has been a favorite positional control element with numerical control designers because of its unique inherent capability to compute the shortest distance between desired and actual position, and because of its capability of resolving unambiguously and monatonically all portions of its normal 360° travel. The synchro demodulator system is generally very rugged but has limited accuracy.

A generally more accurate and simpler to interface transducer is the digital encoder. It has been used for many years to accurately measure the positional parameters of control devices with very high accuracy and reliability. While these performance parameters have been valuable for readout purposes, they have presented severe problems to designing the servo loop system. They have operated satisfactorily, however, with computers, but such are relatively expensive.

SUMMARY OF THE INVENTION

The invention comprises a system for generating a signal for controlling the rotation of a shaft supporting an antenna so that the antenna is rotated the shortest angular distance from a present angular position to a new desired angular position. The system includes a conventional shaft encoder means coupled to the shaft which generates a digital encoder signal indicating the present position of the shaft. An encoder register is provided for storing the digital encoder signal so that such can be compared with a digital command signal that has been previously strobed into an up/down counter. A clock means is coupled to the up/down counter and a digital accumulator for generating a chain of pulses for causing the up/down counter to count responsive to each clock pulse received, and for also causing the digital accumulator to accumulate the total number of clock pulses received. When the count in the up/down counter equals the digital encoder signals stored in the encoder register a compared signal is generated. This compared signal is fed as a strobe signal to a digital analog converting means which converts the information stored in the accumulator to an analog signal. If the accumulator reaches a value greater than 180°, an error signal is generated by a sensing means stopping the clock pulses and resetting the entire circuit. The error signal is also fed to a control flip-flop coupled to the up/down counter which causes the up/down counter to count in the opposite direction on the next cycle. Therefore, the output from the digital to analog converter, which is coupled to an antenna drive motor, always has a magnitude equal to or less than 180° so as to ensure that the antenna is rotated the shortest angular distance from a present angular position to a new desired angular position. A modified form of the invention incorporates a pair of counters, one of which counts up, while the other counts down. These counters are activated by clock pulses. A compared signal is generated when the earliest count produced by the counters equals the digital information stored in the encoder storage register. This compared signal is fed as a strobe signal to the digital to analog converter, as well as to the accumulator causing information stored in the accumulator to be converted to an analog signal. The analog signal possesses a sign portion which controls the direction of rotation of the analog drive motor. This sign signal is produced by the counter, which is the first to be incremented or deincremented to the value of the digital encoded signal stored in the encoder storage register.

Accordingly, it is a general object of the present invention to provide an improved digital servo controller.

Another important object of the present invention is to provide a digital system which will make a comparison between the desired angular position of a shaft and the present angular position so as to determine the shortest angular distance of rotation to the desired position.

Another important object of the present invention is to provide a digital system which does not lose data points while making comparisons between a desired angular position and the present angular position.

Still another important object of the present invention is to provide a digital system for generating an analog signal having a sign portion indicating the direction of rotation of the drive motor, as well as the actual angular rotation desired.

These and other objects and advantages of the invention will become apparent upon reference to the following specification, attendant claims and drawings.

Figure 1:
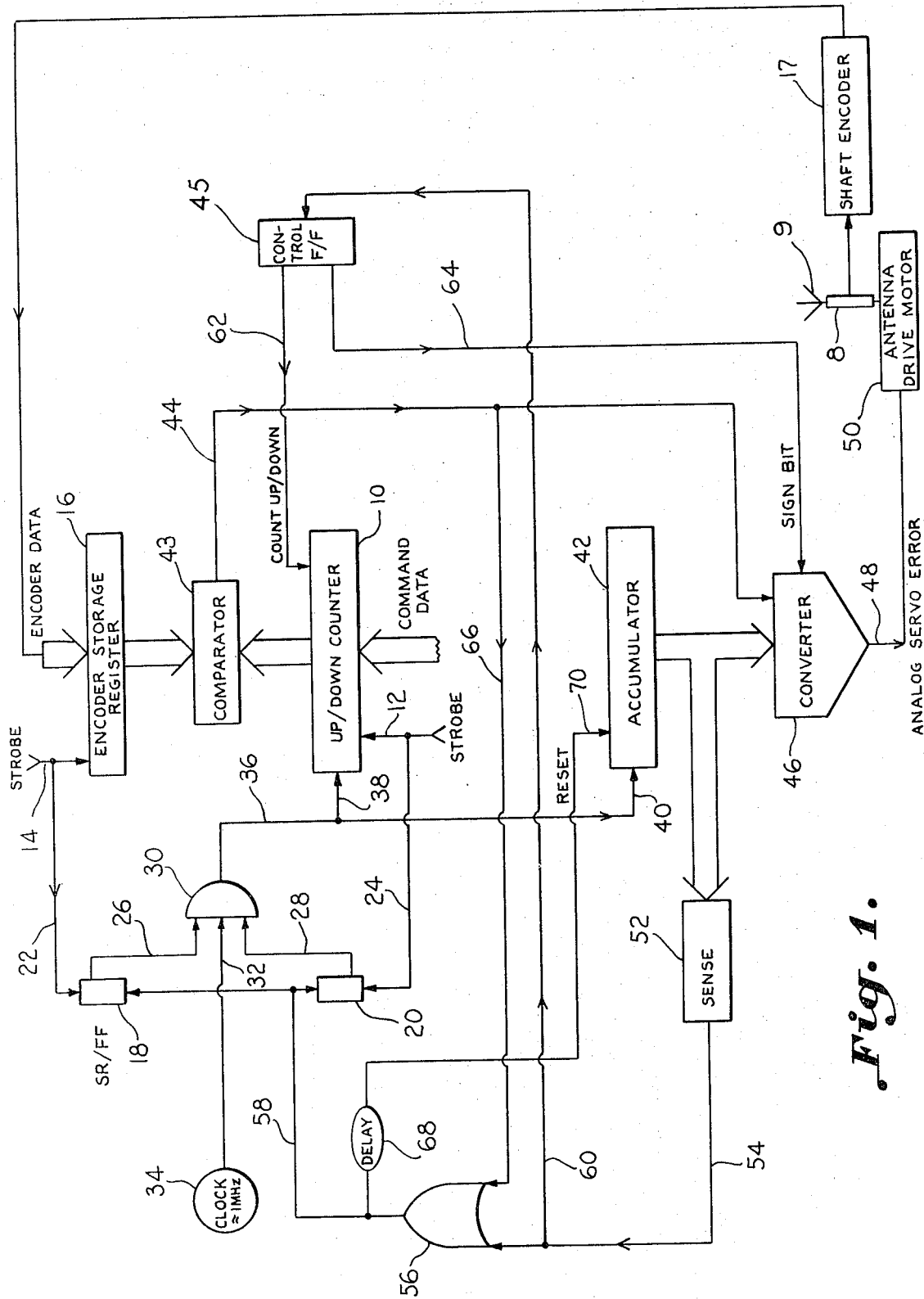
FIG. 1 is a block diagram illustrating a system for rotating an antenna shaft the shortest distance from a present angular position to a desired angular position.

Referring in more detail to the drawings, there is illustrated in FIG. 1 a system constructed in accordance with the present invention. Command data in the form of a digital signal for rotating a shaft 8 upon which an antenna 9 is supported is strobed into an up/down counter 10 by a digital strobe signal appearing on a strobe input lead 12. This strobe signal is also applied to the input lead 14 of an encoder storage register 16 for strobing in a digital signal corresponding to the present angular position of the shaft 8. A conventional shaft encoder 17 is coupled to the shaft 8 for producing digital signals indicating the present angular position of the shaft 8. The strobe signal which appears on input leads 12 and 14 of the up/down counter 10 and the encoder storage register 16 is also fed to flip-flops 18 and 20 by means of leads 22 and 24. The flip-flops 18 and 20 have outputs 26 and 28, respectively, which are coupled to respective inputs of an AND gate 30. The AND gate 30 has another input 32 which is directly coupled to the output of a one megahertz clock pulse source 34.

Thus, when the flip-flops 18 and 20 are activated by the strobe pulses, signals are applied over leads 26 and 28 to enable the AND gate 30 for allowing the clock pulses from the clock 34 to pass therethrough to output lead 36. The output lead 36 of the AND gate 30 is coupled to an input 38 of the up/down counter 10, as well as to an input 40 of an accumulator 42. The clock pulses appearing on input lead 38 of the up/down counter 10 and input lead 40 of the accumulator 42 cause the counter 10 to begin counting in a direction controlled by a control flip-flop 44. The accumulator 42 simultaneously begins counting the total number of pulses allowed to pass through the AND gate 30.

The up/down counter 10 begins counting from the position initially set by the digital command signal which represents the desired angular position of the shaft 8. When the count of the up/down counter 10 reaches a value equal to the digital information stored in the encoder register such causes a comparator 43, which is coupled to both the encoder storage register 16 and the up/down counter 10 to produce a compared signal on its output lead 44. This compared signal is fed directly to a digital to analog converter 46 for directing the converter to convert the digital signal stored in the accumulator 42 to an analog signal. The analog signal is fed over output leads 48 to an antenna drive motor 50 for rotating the shaft 8 an angular rate corresponding to the difference between the digital command signal representing the desired angular position and the digital encoder signal stored in the encoder register 16 representing the present angular position.

The accumulator 42 has a sensing circuit 52 coupled thereto, which produces an error signal on output lead 54 if the accumulator 42 is permitted to reach a count corresponding to more than 180° of angular correction. If greater than 180° angular correction is reached prior to the compared signal appearing on lead 44, error signal 54 appearing on the output of the sensing circuit 52 is allowed to pass through the OR gate 56 to lead 58, which is coupled to an input of the flip-flops 18 and 20. This error signal causes flip-flops 18 and 20 to be reset disenabling the AND gate 30. Thus, the clock pulses coming from the clock 34 are prevented from being fed to the up/down counter 10 and accumulator 42 stopping the counting cycle.

It is also noted that the error signal being produced by the sensing means 52 is fed over lead 60 to the input of the control flip-flop 45 causing such to change state. When the control flip-flop 45 changes state a signal is supplied over lead 62 causing the up/down counter 10 to be reset. The change of state of the control flip-flop causes the counter to count in the opposite direction on the next cycle. The control flip-flop 45, also, produces a sign signal on lead 64 which is fed to the digital to analog converter so that on the next cycle the digital to analog converter 46 will produce an analog signal having a sign opposite that from the previous cycle.

In addition to the compared signal when produced on lead 44 being supplied to the digital to analog converter 46 for converting the information stored in the accumulator 42, it is also fed by lead 66 to another input of the OR gate 56. Therefore, when either a compared signal appearing on the output of the comparator 43 or an error signal appearing on the output of the sensing means 52 is produced, a signal appears at the output of the OR gate 56 and is applied through a delay circuit 68 to the input 70 of the accumulator 42 for resetting the accumulator.

If the up/down counter 10 initially counted in the wrong direction indicating that the angular direction of rotation of the antenna shaft 8 to be more than 180°, the sensing means 52 would produce the error signal which would, as previously mentioned, reset the entire circuit prior to the information in the accumulator being converted by the digital to analog converter 46. On the next cycle when the strobe pulse which is produced by any suitable means, is applied to the input of the up/down counter 10, it counts in the opposite direction from the position initially set by the command signal. Therefore, a compared signal appears on the output lead 44 of the comparator prior to the error signal being produced by the sensing means 52. When the compared signal is produced the digital to analog converter 46 converts the information in the accumulator to an analog signal. This signal contains a sign portion received from the flip-flop 45 for rotating the antenna shaft 8 the shortest distance from the present position of the antenna shaft to the desired angular position.

One problem with the circuit illustrated in FIG. 1 is that if the initial assumption as to the direction of counting of the up/down counter 10 is wrong, then that information is lost.

Figure 2:
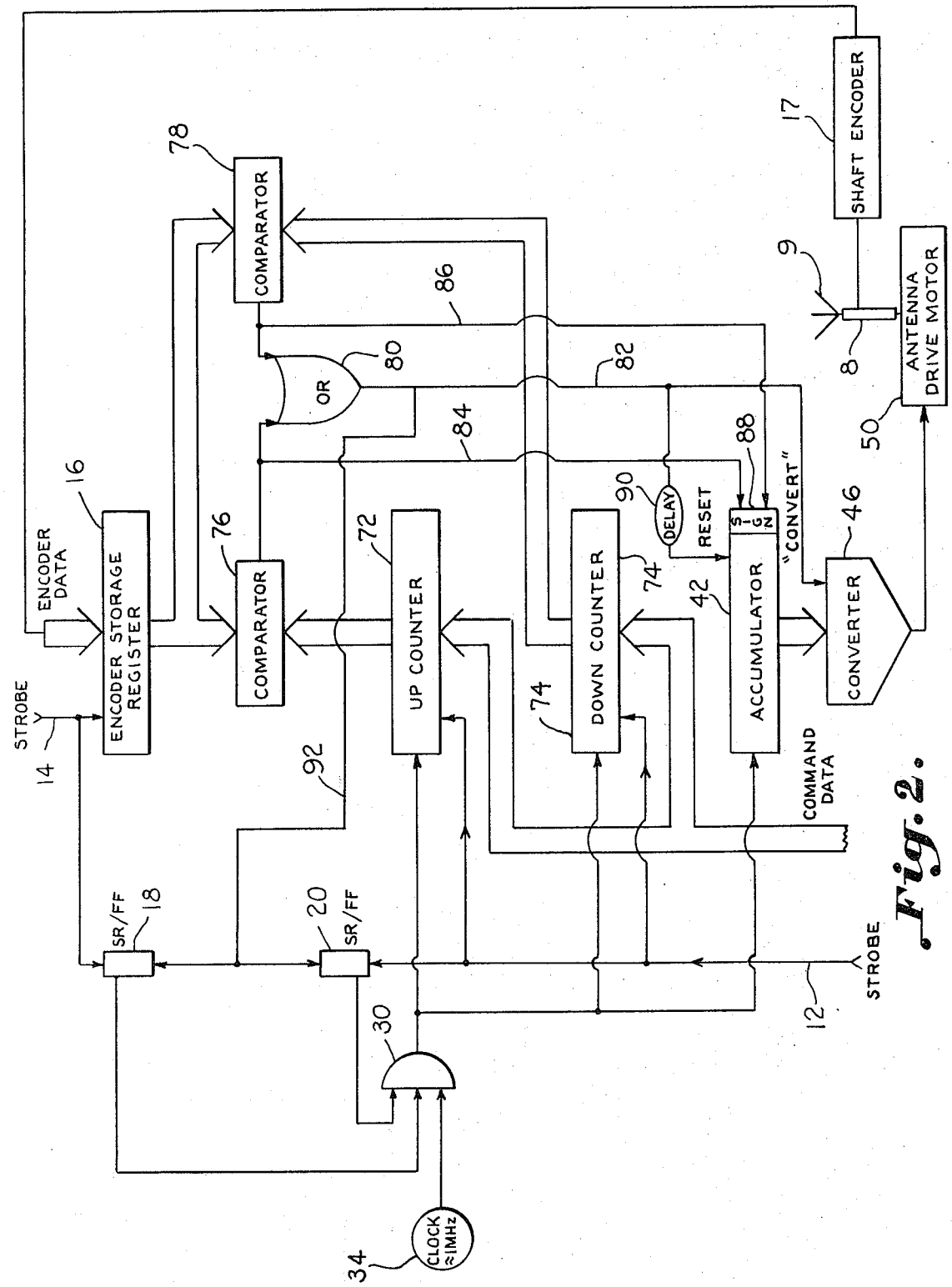
FIG. 2 is a block diagram of a modified form of the invention.

In the circuit illustrated in FIG. 2, instead of using a single up/down counter 10, as is the case in the circuit illustrated in FIG. 1, a pair of counters 72 and 74 are utilized. Counter 72 is provided for counting upwardly from the initial digital value set by the digital command signal and the counter 74 is provided for counting downwardly from the initially set position provided by the digital command signal. The digital command signal is fed to both the up counter 72 and the down counter 74, as indicated.

A separate comparator is provided for comparing the signal stored in each of the counters 72 and 74 for producing a compared signal when the count of a particular counter equals the digital encoded signal representing the present position of the antenna shaft 8 stored in the encoder storage register 16. A comparator 76 is connected between the up counter 72 and the encoder storage register 16, and a comparator 78 is connected between the encoder storage register 16 and the down counter 74. The output of the comparators 76 and 78 are coupled through an OR gate 80 which has an output connected to the digital to analog converter by lead 82 so as to cause the digital to analog converter 46 to convert the digital information accumulated in the accumulator 42 similar to that in FIG. 1 when a compared signal is produced by either of the comparators 76 or 78.

In order to provide a sign characteristic for the analog signal the output of the respective comparators 76 and 78 are coupled by means of leads 84 and 86, respectively, to a sign producing circuit 88 associated with the accumulator 42. Therefore, if the compared signal is produced by comparator 76 the analog signal produced by the digital to analog converter 46 will have one sign and, if the signal is produced by the comparator 78, the analog signal produced by the converter 46 will have the opposite sign. The accumulator 42 is also reset by the signal appearing on the output of the OR gate 82 after it passes through a suitable delay provided by the delay circuit 90.

The output of OR gate 80 is also coupled by lead 92 to the flip-flops 18 and 20 for resetting the flip-flops upon receiving a compared signal from either the comparator 76 or 78. When the flip-flops 18 and 20 are reset such disables the AND gate 30 preventing clock pulses from being fed to the up counter 72, down counter 74, and accumulator 42.

By using separate up and down counters 72 and 74, and a pair of comparators 76 and 78 the sensing circuit 52 illustrated in FIG. 1 is eliminated, since the count totaled in the accumulator 42 is never permitted to reach a count corresponding to more than 180 angular degrees. Therefore, the analog signal produced at the output of the digital to analog converter 46 always represents a signal indicating the shortest angular distance that the antenna shaft 8 can be rotated from its present position to its desired angular position.

In summarizing the operation of the circuit illustrated in FIG. 2, first the command signal representing in digital form the desired angular location of the antenna 8 is fed to up counter 72 and the down counter 74. Simultaneously therewith, the shaft encoder 17 supplies in digital form a signal to the encoder storage register 16 representing the present angular position of the antenna shaft 8. A strobe pulse is applied which causes the encoded digital signal to be strobed into the encoder storage register 16, and the command digital signal strobed into the up counter 72, as well as the down counter 74. The strobe signal is also applied to the flip-flops 18 and 20 setting them. When the flip-flops 18 and 20 are set such causes the AND gate 30 to be enabled allowing the clock pulses produced by the clock source 34 to be fed there through to the up counter 72, down counter 74, and accumulator 42. The clock pulse coming into the up counter 72 causes the up counter 72 to be incremented upwardly. Clock pulses coming into the down counter 74 causes counter 74 to to be incremented downwardly and the clock pulses being fed to the accumulator 42 are totaled.

The counters 72 and 74 count in opposite directions until one of the counters equals the digital signal stored in the encoder register 16. At this time a compared signal is produced by either the comparator 76 or 78 depending on which counter counted to the value stored in the encoded storage register 16. Assuming that the up counter 72 equals the information stored in the encoder register 16 the comparator 76 would produce a compared signal which is fed through the OR gate 80 to the digital to analog converter 46. Simultaneously therewith, the compared signal is fed over lead 84 to the sign circuit 88 associated with the accumulator 42. The digital to analog converter converts the information stored in the accumulator 42 to an analog signal having an appropriate sign. This analog signal is fed to the antenna drive motor causing such to rotate in the proper direction to the desired angular position set by the command signal. When the compared signal passes through the OR gate 80 it is fed back over lead 92 to the flip-flops 18 and 20 resetting the flip-flops to disable the AND gate 30 to prevent clock pulses from passing therethrough. The accumulator 42 is also reset by the compared signal coming through the OR gate 80 after passing thorugh a delay circuit 90.

While a preferred embodiment of the invention has been described using specific terms, such description is for illustrative purposes only, and it is to be understood that changes and variations may be made without departing from the spirit or scope of the following claims.

What is claimed is:

1. A system for generating a signal for controlling the rotation of a shaft supporting an antenna so that said antenna is rotated the shortest angular distance from a present angular position to a new desired angular position comprising:
   a. a shaft encoder means coupled to said shaft for generating a digital encoder signal indicating the present position of said shaft,
   b. an encoder storage register for storing said digital encoder signal,
   c. means for generating a digital command signal representing the desired position of said shaft,
   d. an up-down counter means provided for receiving said digital command signal,
   e. a comparator coupled to said encoder storage register and said up-down counter for generating a compared signal when the count of said up-down counter means equals said encoder signal,
   f. a digital accumulator,
   g. clock means coupled to said up-down counter means and said accumulator for generating a chain of clock pulses for causing said up-down counter to count responsive to each clock pulse received and for causing said accumulator to accumulate the total number of clock pulses received,
   h. a digital to analog converting means coupled to said accumulator for converting said accumulated total number of clock pulses received by said accumulator to an analog signal upon being activated,
   i. means for transmitting said compared signal for activating said digital to analog converting means responsive to said up/down counter means counting to a level equal to said digital encoder signal stored in said encoder,
   j. an antenna drive motor being energized by said analog signal for rotating said shaft a predetermined angular rate corresponding to the value of said analog signal, and
   k. a sensing means coupled to said accumulator producing an error signal for stopping said clock pulses if said accumulator reaches a count corresponding to greater than 180° prior to a compared signal being generated,
   whereby an analog signal is produced for energizing said drive motor for rotating said shaft in the direction wherein the desired angular rotation is equal to or less than 180°.

2. The system as set forth in claim 1 further comprising:
   a. a control flip-flop coupled between said sensing means and said up/down counter for causing said counter to be set to count in the opposite direction upon receiving said error signal.

3. The system as set forth in claim 2 wherein:
   a. said control flip-flop supplies a sign bit to said digital to analog converting means for controlling the direction of rotation of said antenna drive motor.

4. The system as set forth in claim 1 further comprising:
   a. a reset circuit forming part of said accumulator,
   b. a delay circuit having an output coupled to said reset circuit of said accumulator, and c. means for coupling said output of said sensing means and said comparator to said delay circuit so that after a predetermined duration after either a compared signal or an error signal is generated said accumulator is reset.

5. A system for generating a signal for controlling the rotation of a shaft supporting an antenna so that said antenna is rotated the shortest angular distance from a present angular position to a new desired position comprising:
   a. a shaft encoder means coupled to said shaft for generating a digital encoder signal indicating the present position of said shaft,
   b. an encoder storage register for storing said digital encoder signal,
   c. means for generating a digital command signal representing the desired position of said shaft,
   d. an upwardly counting counter receiving said digital command signal,
   e. a downwardly counting counter receiving said digital command signal,
   f. a first comparator coupled to said encoder storage register and said upwardly counting register for generating a first compared signal if the count of said upwardly counting counter equals said encoder signal,
   g. a second comparator coupled to said encoder storage register and said downwardly counting register for generating a second compared signal if the count of said downwardly counting counter equals said encoder signal,
   h. a digital accumulator,
   i. clock means coupled to said upwardly and downwardly counting counters and said accumulator generating a chain of pulses for causing said upwardly counting counter to count up and said downwardly counting counter to count down from said digital command signal and said accumulator to accumulate the total number of pulses received,
   j. a digital to analog converting means coupled to said accumulator for converting said accumulated total number of clock pulses received from said accumulator to an analog signal upon being activated,
   k. means for transmitting the earliest generated compared signal to said accumulator and said digital to analog converting means for causing an analog signal to be generated having a sign and amplitude, and
   l. an antenna drive motor coupled to said digital to analog converting means for receiving said analog signal therefrom and rotating said shaft a predetermined angular rate corresponding to the sign and amplitude of said analog signal,
   whereby said antenna is rotated the shortest angular distance from a present angular position to a new desired position.

* * * * *